Patented Mar. 16, 1954

2,672,443

UNITED STATES PATENT OFFICE 2,672,443

SELF-LUBRICATING BEARING

Joseph J. Screnock, Somerville, N. J., assignor to Johns-Manville Corporation, New York, N. Y., a corporation of New York No Drawing. Application November 22, 1948, Serial No. 61,520

5 Claims. (Cl. 252—12.6)

This invention relates to self-lubricating bearings, and is particularly concerned with a self-lubricating bearing of improved composition and properties.

The U. S. Patent No. 1,054,265 of L. H. Baekeland, dated February 25, 1913, describes self-lubricating bearings and bushings which are adapted for use with high speed rotary shafts, and which comprise graphite and reinforcing fibers such as asbestos or wood pulp dispersed in a hardened infusible resin matrix of phenolic resin composition. In bearings and bushings of the indicated composition, the self-lubricating properties are imparted by the graphite, which may be present in proportions amounting to 25–50% or more by weight of the bearing.

An object of the present invention is to provide an improved self-lubricating bearing or bushing embodying an infusible resin binder matrix which is substantially more durable in service and has a markedly lower rate of wear and coefficient of friction, as compared to conventional bearings of this type.

The present self-lubricating bearings developed from the discovery that the rate of wear and coefficient of friction of a bearing incorporating graphite in a phenolic resin matrix, can be very markedly reduced by incorporating in the bearing composition wood flour or equivalent absorbent filler material saturated with a relatively small amount of a fluid lubricant of heat stable organic ester type. For example, 5% by weight of a polyhydric alcohol ester of a non-drying higher fatty acid, such as diethylene glycol laurate, when incorporated in a self-lubricating bearing comprising chiefly graphite in a matrix of hardened phenolic resin, develops a remarkable lowering of the coefficient of friction and wear characteristics of the bearing, and markedly reduces and stabilizes the operating temperature developed within the bearing during service. The wood flour serves as an absorbent and retaining medium for the ester lubricant whereby the lubricant is distributed and stored throughout the body of the bearing.

With the above objects and feature in view, the invention consists in the improved self-lubricating bearing which is hereinafter described and more particularly defined by the accompanying claims.

An example of a suitable composition for producing self-lubricating bearings in accordance with the present invention is the following:

| | Per cent by weight |
|---|---|
| Heat hardenable liquid phenol-formaldehyde resin | 20 |
| Powdered crystalline graphite (100–300 mesh) | 50 |
| Asbestos fiber | 20 |
| Wood flour (100–200 mesh) saturated with an approximately equal weight of diethylene glycol (mono) laurate | 10 |

In the above formula the glycol laurate comprises about 5% by weight of the dry solids composition of the bearing.

In producing the bearing, a liquid A-stage phenol-formaldehyde resin is diluted with an approximately equal weight of ethyl alcohol. The resulting solution is placed in a rotary blade mixer in which the blades are revolved at slow speed. The wood flour is saturated with the diethylene glycol laurate before admixture with the other ingredients. The powdered graphite, saturated wood flour and asbestos fibers are added to the resin solution in the mixer, and all of these ingredients are thoroughly blended within the mixer during a mixing period of about twenty minutes. The thus thickened mixture is then molded by extrusion to form a tube of suitable dimensions, and this tube is allowed to dry at room temperature for several days. The dried tube is then cut to suitable lengths, and each tube section is cold pressed into final bushing or bearing dimensions under a pressure of about 20,000 lbs./sq. in. The cold pressed bushings or bearings are then placed in an oven and heat cured for a time, and at a temperature, required to effect final condensation hardening of the resin. The curing temperature should be kept below the vaporizing temperature of the glycol laurate lubricant, i. e. below about 250° C.

The present self-lubricating bearings are not limited to the specific composition and method of manufacture which are related in the aforementioned example. The proportions of graphite, reinforcing fibers and heat hardenable resin binder may be substantially varied, and the method is not limited to any particular order of mixing the ingredients preparatory to molding, or to any particular molding and curing cycle. Suitable bushings and bearings have been made employing thermosetting resins other than those formed by reaction between phenol and formaldehyde. For example, suitable binders are obtained using resins formed by reaction of phenol or phenol homologues such as cresol, with other aldehydes such as furfuryl aldehyde. It is desirable that the molding composition contain at least 20–30% by weight of the resin binder, together with a substantial amount, say 15–30% of heat resistant reinforcing fibers such as asbestos, in order to impart the necessary strength and toughness without brittleness to the final cured bearing. The amount of lubricant saturated wood flour should normally comprise 8–12% by weight of the bearing.

Tests have shown that under high speeds and loads the present bearings are exceptionally efficient and long wearing in comparison with bearings of comparable composition which do not contain the small amount of added polyhydric alcohol ester of fatty acid. For example, bearings made in accordance with the present invention containing about 5% by weight of diethylene glycol laurate as a lubricant, were compared in long service tests with bearings of the same composition which contained no diethylene glycol laurate. The presence of the 5% of diethylene glycol laurate in the test bearings was effective for reducing the coefficient of friction in the ratio of about 3.5 to 2, or in other words, from 0.43 to 0.24. In both bearings the amount of graphite present was 50% by weight of either amorphous or crystalline graphite. These tests were made in twenty hour runs with a surface speed of a metal shaft journaled in the bearing of 580 feet per minute, running at 3600 R. P. M.

Weighing of the test bearings at the end of the twenty hour test run proved that the bushing or bearing containing 5% diethylene glycol laurate suffered only about 4% of the wear loss of the comparison bearing. Also the bearing containing the glycol laurate in the amount indicated operated throughout the test at a temperature which was about two-thirds the operating temperature of the comparison bearing containing no diethylene glycol laurate. The operating temperature of the bearing containing 5% diethylene glycol laurate was approximately constant throughout the twenty hour test, and averaged between 300 and 330° F. The rate of wear was less than 0.3%. The operating temperature of the comparative bearing containing no diethylene glycol laurate, throughout the last sixteen hours of the test, averaged 470 to 480° F. The rate of wear approximated 7.3%. At the completion of the test it was found that the test bearing containing no diethylene glycol laurate had deposited a gummy residue on the rotating metal shaft in the vicinity of the bearing, apparently as a result of some heat decomposition of the resin binder due to the comparatively high mean operating temperature of the bearing. No such residue was found on the shaft journaled in the bearing containing diethylene glycol laurate, at the end of the test run.

The foregoing observations have been checked by numerous comparison tests of bushings and bearings made in accordance with the present invention in comparison with bushings and bearings of similar composition containing graphite as the sole self-lubricating component of the bearing composition.

The exceptional self-lubricating property of the present bearings which is imparted by the presence of a very small amount (3–6% by weight of the bearing) of a heat stable organic ester lubricant is dependent in substantial degree on uniform distribution of the ester throughout the body of the bushing as a saturant in wood flour or equivalent absorbent cellulosic material. The wood flour or equivalent absorbent functions as a retainer for the ester whereby the ester lubricant is fed to the friction face of the bearing at a rate which is limited to the rate at which saturated wood flour is exposed at the wear face of the bearing.

Suitable non-drying fatty acid esters have been found to include the esters of palmitic, myristic, lauric, ricinoleic and stearic acids. The esterifying alcohol is a polyhydric alcohol such as glycerol, polyethylene glycols including di-, or triethylene glycol, and propylene and higher alkyl glycols. Favorable results have also been obtained by using di-2-ethyl hexyl phthalate as a lubricant. The preferred esters are those having vaporizing temperatures approximating 400° F. or higher and which are soluble in alcohol solvents. Such ester lubricants can be incorporated with alcohol solvent reduced hardenable resins to form homogeneous molded products having stable self-lubricating properties at the temperatures to which the products are heated during cure and in service.

The invention which has been thus described by detailed example is not limited as to such details and it is to be understood that variations, changes and modifications are contemplated within the scope of the invention as defined by the following claims.

What I claim is:

1. A self-lubricating bearing comprising a matrix of infusible, insoluble phenolic-aldehyde resin, said resin matrix having distributed therethrough sufficient graphite to lend said bearing self-lubricating properties, heat-resistant fibers in amount sufficient to reinforce said bearing, and 8–12% by weight of wood flour saturated with a polyhydric alcohol ester of a non-drying higher fatty acid lubricant, said ester comprising 3–6% by weight of the bearing.

2. A self-lubricating bearing comprising a matrix of infusible, insoluble phenolic-aldehyde resin, said resin matrix having distributed therethrough sufficient graphite to lend said bearing self-lubricating properties, heat-resistant fibers in amount sufficient to reinforce said bearing, and 8–12% by weight of wood flour saturated with a polyhydric alcohol ester of a non-drying higher fatty acid selected from the group consisting of palmitic, myristic, lauric, ricinoleic, and stearic acids, said ester comprising 3–6% by weight of the bearing.

3. A self-lubricating bearing comprising approximately 20–30% by weight of a matrix of infusible, insoluble phenolic-aldehyde resin, said resin matrix having distributed therethrough sufficient graphite to lend said bearing self-lubricating properties, approximately 15–30% by weight of heat-resistant fibers, and 8–12% by weight of wood flour saturated with a polyhydric alcohol ester of a non-drying higher fatty acid lubricant, said ester comprising 3–6% by weight of the bearing.

4. A self-lubricating bearing comprising approximately 20–30% by weight of a matrix of infusible, insoluble phenolic-aldehyde resin, said resin matrix having distributed therethrough sufficient graphite to lend said bearing self-lubricating properties, approximately 15–30% by weight of heat-resistant fibers, and 8–12% by weight of wood flour saturated with a polyhydric alcohol ester of a non-drying higher fatty acid selected from the group consisting of palmitic, myristic, lauric, ricinoleic, and stearic acids, said ester comprising 3–6% by weight of the bearing.

5. A self-lubricating bearing comprising a matrix of infusible, insoluble phenolic-aldehyde resin, said resin matrix having distributed therethrough sufficient graphite to lend said bearing self-lubricating properties, reinforcing asbestos fiber, and 8–12% by weight of wood flour saturated with glycol laurate lubricant, said lubricant comprising 3–6% by weight of the bearing.

JOSEPH J. SCRENOCK.

References Cited in the file of this patent

UNITED STATES PATENTS

| Number | Name | Date |
| --- | --- | --- |
| 1,054,265 | Baekeland | Feb. 25, 1913 |
| 1,370,800 | Egerton | Mar. 8, 1921 |
| 1,409,148 | Apple | Mar. 14, 1922 |
| 1,482,414 | Schmidt | Feb. 5, 1924 |
| 1,720,051 | Norton | July 9, 1929 |
| 1,964,202 | Hooper | June 26, 1934 |
| 2,128,087 | Gatke | Aug. 23, 1938 |
| 2,219,054 | Palm | Oct. 22, 1940 |
| 2,326,000 | Teeple | Aug. 3, 1943 |
| 2,338,480 | Auxier | Jan. 4, 1944 |

OTHER REFERENCES

"Chemicals by Glyco" (Bluebook), Glycol Products Company, Brooklyn, N. Y.—Copyright 1944.